United States Statutory Invention Registration [19]

[11] Reg. Number: H870

Lutz [43] Published: Jan. 1, 1991

[54] SOLVENT WELDING POLYBUTENE-1

[75] Inventor: Robert G. Lutz, Houston, Tex.

[73] Assignee: Shell Oil Company, Houston, Tex.

[21] Appl. No.: 40,684

[22] Filed: Apr. 17, 1987

Related U.S. Application Data

[63] Continuation of Ser. No. 679,426, Dec. 7, 1984, abandoned.

[51] Int. Cl.[5] ..... B32B 31/20; B32B 27/08; C09J 5/00

[52] U.S. Cl. ..... 156/308.6; 156/309.6; 156/322; 264/343; 428/516; 106/311; 352/364

[58] Field of Search ..... 156/308.6, 309.6, 83, 156/334, 322; 264/343; 428/516; 106/311; 252/364

[56] References Cited

U.S. PATENT DOCUMENTS

| | | | |
|---|---|---|---|
| 2,979,774 | 4/1961 | Rusignolo . | |
| 3,073,736 | 1/1963 | Lange | 156/308.6 |
| 3,506,519 | 1/1967 | Blumenkranz . | |
| 3,514,359 | 5/1970 | Frese | 156/308.6 |
| 4,113,804 | 9/1978 | Cotten et al. | 525/232 |

OTHER PUBLICATIONS

Schard, "Polybutylene", Modern Plastics Encyclopedia, vol. 51, No. 10A, pp. 70–71, 10–1974.

*Primary Examiner*—Richard D. Lovering
*Assistant Examiner*—John M. Covert
*Attorney, Agent, or Firm*—Wendy K. B. Buskop

[57] ABSTRACT

A process for solvent welding pure polybutene-1, or blends or copolymer of polytbutene-1 to polybutene-1 where the polybutene-1 items are contacted with a solvent such as methylene chloride, tetrahydrofuran or cyclohexane and then contacted together within a variable period of time after solidification of the polybutene-1 items.

14 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

POLYBUTENE-1 CAP ON POLYPROPYLENE LAMINATE

POLYBUTENE-1 CAP ON POLYPROPYLENE LAMINATE

SOLVENT WELDING POLYBUTENE-1

This is a continuation of application Ser. No. 679,426, filed Dec. 7, 1984 now abandoned.

The present invention pertains to a process for solvent welding polybutylene. More particularly, the present invention pertains to a process for solvent welding polybutene-1 wherein the polybutene-1 items to be welded are solvent welded within a certain time interval after polybutene-1 solidification from a melt.

BACKGROUND OF THE INVENTION

Polybutene-1 is widely used for production of flexible pipe, pipe fittings and various injection molded articles. Flexible pipe is generally manufactured by extrusion. However, difficulties arise in joining polybutene-1. Joining polybutylene articles has been accomplished by conventional mechanical means such as threaded joints and flange connections, by thermal means such as flame or electrical resistance welding, or fusing with a welding sleeve, where external pressure is applied to articles being joined at predetermined times during the welding process so that the articles in the welding sleeve are held in contact throughout the operation. See U.S. Pat. No. 3,506,519.

Fusion welding is a commonly employed method of joining thermoplastic materials. Heat is applied or generated by any of a wide variety of methods at the two surfaces to be joined until they become molten. The surfaces are then brought together while they are still in the molten state, whereafter polymer chain segment interdiffusion proceeds and the interface between the two original surfaces becomes diffuse or altogether disappears. Subsequent cooling then restores the material strength and the bonded region may have strength equal to that of the surrounding material. The strength of amorphous polymers develops upon vitrification or passing below the glass transition temperature of entangled chains whereas that of semicrystalline polymers develops by the crosslink-like network of crystalline domains. It is common practice to join polybutylene by fusion welding.

Non-crystalline, amorphous polymers such as polystyrene or polycarbonate can be readily solvent welded to form strong joints simply by the application of an appropriate solvent to the surface, followed by the bringing together of two such surfaces for a certain length of time. This process generally occurs without the application of heat, by slow solvation of the amorphous polymer at the two surfaces which increases the chain segment mobility, effectively lowering the glass transition temperature locally to ambient temperature. Subsequently, chain entanglement across the interface can follow and diffusion of solvent into the surrounding material then gradually restores the polymer to its original properties. This process leaves the two surfaces effectively welded together with very high strength, often approaching the full strength of the material. This process is analogous to fusion welding but has the advantage that it can be accomplished more leisurely and at ordinary temperatures.

In contrast to non-crystalline, amorphous polymers, however, semicrystalline polyolefins such as polypropylene, polyethylene and polybutylene, generally cannot be successfully joined by solvent welding. In these materials the amorphous polymer segments are constrained by participation in nearby crystallites. The response of this type of crystalline-amorphous structure to solvents is analogous to that of a crosslinked network. Swelling of the amorphous phase by good solvents can occur, but unless the crystallites dissolve or are melted, the chain segments are not free to diffuse across the interface and to entangle into the adjacent surface. In the process of fusion welding, on the other hand, the crystallites are not longer present and intersegment diffusion is facile. There has been a long felt need in the thermoplastic industry for a method of solvent welding semicrystalline polymers.

U.S. Pat. No. 4,113,804 claims various polybutene-1 compositions that can be solvent welded and that can be used with solvent to form adhesives for those compositions. However, all of these compositions must contain EPDM interpolymer elastomer of ethylene, polyene and monoolefin, an amorphous, non-crystalline ingredient. Column 3, line 50 of U.S. Pat. No. 4,113,804 reveals that the amorphous elastomer is present in an amount which enhances the adhesive qualities of the polybutene-1, indicating clearly its role in affecting weldability. Column 3, line 47 reveals that the amorphous elastomer may be present in amounts greater than the polybutene-1. Further, U.S. Pat. No. 4,113,804 in column 12, line 10 discloses more rapid crystallization of the aforementioned blends than occurs with pure polybutene and claims that as an advantage. Still further, U.S. Pat. No. 4,113,804 reveals in column 9, line 24 that, prior to welding, the plastic article may be treated with an oxidizing material but nowhere mentions the time window immediately after solidification from the melt as a necessary parameter of the invention. No examples are given showing the effectiveness of solvent welding of these amorphous EPDM compounds.

SUMMARY OF THE INVENTION

It is the essence of this invention to teach a hitherto unknown method for solvent welding crystalline polybutylene-1, crystalline polybutylene-1 copolymers and crystalline polybutene-1 blends in which it is the inherent retarded crystallization of polybutene-1 that is employed to effect true solvent welding of the semicrystalline polymer phase without the addition of non-crystalline components. The instant invention relies on carrying out solvent welding in a time window after the surfaces to be joined have been cooled from the melt. The method differs from fusion welding in that the bonding takes place at ambient temperatures rather than above the crystalline melting temperature.

The method recited by the instant invention for solvent welding materials containing polybutene-1 crystallinity such as homopolybutene-1, its copolymers and blends with other thermoplastics is as follows: (1) Freshly melt formed and solidified articles and/or articles having surfaces that were freshly fused and resolidified are selected for welding. (2) The welding is carried out in a time window prior to excessive, spontaneous crystallization of the polybutene-1 phase but after solidification of the surfaces. For homopolybutene-1 and cyclohexane at normal ambient temperatures, the time window after solidification is approximately 15 minutes. (3) Solvent is applied to the article surfaces. (4) The surfaces are brought into intimate contact. (5) The surfaces are allowed to remain in contact for sufficient time for the solvent to diffuse away from the joint.

DRAWINGS

FIG. 1 is a laminate with a polybutene-1 cap layer on polypropylene.

DETAILED DESCRIPTION OF THE INVENTION

Figure 1:
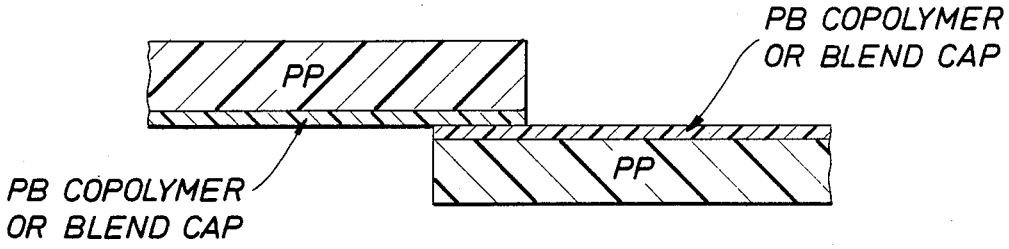

The present invention is a process for permanently adhering an item of polybutene-1 to a second item of polybutene-1. More specifically, it is a process for permanently adhering an item of either pure polybutene-1, a polybutene-1 copolymer or blends of same to a second item of polybutene-1. In the polybutene-1 copolymer, the butene-1 is the predominant monomer, the other monomer being a monoolefin of $C_2$ to $C_{10}$. The blends may contain pure polybutene-1 or polybutene-1 copolymers with any polyolefin from $C_2$ to $C_6$, especially polyethylene and polypropylene. The polymer blend should contain sufficient polybutene-1 or polybutene-1 copolymers so the polybutene items can be solvent welded. The polymer of butene i.e., polybutene-1, is a normally solid crystalline, isotactic, linear polymer having a molecular weight in excess of 100,000. The polymer is generally insoluble in diethylether and most other common solvents and soluble in orthodichlorobenzene. The polybutene-1 in this invention is isotactic polybutene.

Sections of pipe and sheets of film in the composition of this invention can be secured together using the solvents of this invention. Alternatively, for convenience of application and/or improved surface contact during joining, the solvent can be applied in the form of a cement having higher viscosity than that of the pure solvent. Said cement is formed by the dissolution in the solvent of minor amounts of polybutene-1 or a polybutene-1 copolymer which will then become an integral part of the final joint. Polybutene-1 in the form of pellets, film, granulate or powder will dissolve in the solvents of this invention by the application to the mixture of heat and shear. Such cements are convenient for use since they tend to remain metastable without crystallization, for extended time, even when ambient solubility has been exceeded in the composition. If crystallization does eventually occur, changing the rheology of the cement and preventing participation of the dissolved polymer in the formation of the joint, the original consistency can be easily restored by briefly reheating the cement. Alternatively, an amount of polybutene-1 or PB-1 copolymer may be finely divided and admixed with a sufficient amount of solvent or solvent cement to provide a mixture of putty like consistency which may be dried. The putty is self-adhering to plastic articles made from the polybutene-1, especially when they have been freshly solidified from the melt. The putty could also be molded into the shape of a pipe fitting. The molded fitting can be dried and then solvent welded to a pipe using an adhesive of this invention.

First, polybutene-1 items or their surfaces are melted to liquification and then cooled or allowed to cool to solidification. Then the solidified polybutene-1 items are contacted with a sufficient amount of the solvent or solvent cement to allow polymer segments within the polybutene-1 items to entangle upon contact of the items. The solvent may be selected from the group of methylene-chloride, tetrahydrofuran (THF), or cyclohexane, although any other solvent in which polybutene-1 has a finite solubility may be used.

The polybutene-1 surfaces to be joined are contacted with an amount of solvent or cement sufficient to form a film between the surfaces when they are brought into contact, preferably a continuous film without bubbles or gaps. Some degree of surface roughness on one or both of the articles to be joined may assist in the formation of solvent welded joints by trapping solvent between the surfaces when they are brought together under pressure.

The solvent is preferably cyclohexane which yields a solvent welding time window of approximately twenty (20) minutes. When the solvent is cyclohexane the solidified polybutene-1 items may be contacted with the solvent and brought together as long as twenty (20) minutes after the polybutene-1 solidification without loss of solvent weldability. When the solvent is methylene-chloride or tetrahydrofuran, the contact would take place within the first two minutes after solidification of the polybutene-1 items from the liquid melt.

The polybutene-1 may be in the form of a cap layer on polypropylene as may be seen in FIG. 1. Thus, a sheet or film laminate with a polybutene-1 cap could be solvent welded. This may be useful where polypropylene-type characteristics of the sheet or film are desired.

EXAMPLE 1

Lap joints of Shell grade 4127 polybutene-1 homopolymer were prepared by joining two half tensile bars after their outermost surfaces had been briefly fused and then allowed to solidify in ambient air. Experiments showed that solidification occurred very quickly and that the surface cooled to approximately room temperature within less than about one minute. The elapsed time between removal of the fusion heat source and welding was varied to determine the available solvent welding time window. A fusion welding control experiment, wherein no solvent was employed, was included. In other experiments, methylene chloride, tetrahydrofuran or cyclohexane containing 5% dissolved polybutene were applied to the surfaces at varying intervals after solidification, just prior to bringing the surfaces together.

After a period of five days the lap joints were stressed to failure. At a stress level of about 600 psi of lap surface area, the tensile bars failed cohesively, leaving the joint intact. When failure occurred at stress levels below 600 psi of lap area the joints separated. The outcome of these experiments is shown in Table 1.

TABLE 1

| SOLVENT | SOLVENT WELDING TIME WINDOW (MIN.) |
|---|---|
| None (Fusion) | 0.6 |
| Methylenechloride | 2 |
| Tetrahydrofuran | 2 |
| 5% PB/cyclohexane | 15 |

The results in Table 1 indicate that the use of methylene chloride or the THF can allow solvent welding to be accomplished up to two minutes after removal of the heat source, whereas the "open time" for fusion welding is only 0.6 minutes, an increase in the time available for welding of more than three (3) fold. When 5% PB/cyclohexane was used, the time was extended to 15 minutes, an increase of twenty-five (25) fold. Neat cyclohexane has been previously shown by applicants to be effective but was not included in this particular time series.

Applicants speculate that this type of welding is possible because of the slow crystallization rate of polybutylene. It appears that welding occurs between two layers of swollen amorphous polybutylene by segment interdiffusion, followed by intercrystallization. The possibility for solvent welding gradually decreases as crystallization advances in the surfaces to be joined. Ordinary polybutene-1 samples that are not treated in the manner of this invention are generally too highly crystalline to be solvent welded.

The solvent welding time window may be extended beyond the fifteen minutes by use of a better solvent, a higher joint forming temperature and/or methods for inhibiting the crystalline rate, such as holding the solidified surfaces at a low temperature prior to solvent welding.

Variations of the ideas and method expressed in the above description will become apparent to one skilled in the art. It is therefore to be understood that within the scope of the claims the invention may be practiced otherwise then as specifically described.

What is claimed is:

1. A joined article prepared from first and second articles comprising a member of the group consisting of: polybutene-1 homopolymer, a polybutene-1 copolymer or blends thereof, and joined by a solvent welding technique wherein said solvent welding technique consists of the steps of:

melting and cooling to solidification said first and second articles;

contacting at room temperature said solidified first and second articles with a solvent comprising a member of the group consisting of methylene chloride, tetrahydrofuran, and cyclohexane;

contacting said solvent contacted first article with said solvent contacted second article at room temperature to achieve a satisfactory bond.

2. The joined article of claim 1, wherein said joined article is prepared using a solvent in the form of a cement or an adhesive.

3. The joined article of claim 1, wherein said joined article is prepared by contacting said first and second articles together within twenty minutes after melting and cooling said first and second articles to solidification.

4. The joined article of claim 1, wherein said joined article is prepared by contacting said first and second articles together within twenty minutes after melting and cooling said first and second articles to solidification.

5. The joined article of claim 1, wherein said joined article is prepared by contacting said first and second articles together within two minutes after melting and cooling said first and second articles to solidification.

6. A joined pipe prepared from first and second pipes comprising a member of the group consisting of polybutene-1 homopolymer, polybutene-1 copolymer or blends thereof, and joined by a solvent welding technique which consists of the steps of:

melting and cooling to solidification said first and second pipes;

contacting at room temperature said solidification first and second pipes with a solvent comprising a member of the group consisting of methylene chloride, tetrahydrofuran and cyclohexane; and contacting said solvent contacted first pipe with said solvent contacted second pipe at room temperature to achieve a satisfactory bond.

7. A process for permanently adhering a first item of either pure polybutene-1, a polybutene-1 copolymer or blends of the same, to a second item of polybutene-1, which comprises the steps of:

melting and cooling to solidification, one or both of said first and second items of polybutene-1;

contacting at room temperatures said solidified polybutene-1 first and second items with an amount of a suitable solvent sufficient to allow polymer segments within said first and second polybutene-1 items, upon contact of said first and second polybutene-1 items, to entangle; and contacting at room temperature said first solvent contacted polybutene-1 item with said second solvent contacted polybutene-1 item to achieve a satisfactory bond.

8. The process of claim 7, wherein said solvent is selected from the group consisting of methylene chloride, tetrahydrofuran, and cyclohexane.

9. The process of claim 7, wherein said solvent is in an adhesive or cement form.

10. The process of claim 7, wherein said contacting said first and second solidified polybutene-1 items takes place within twenty minutes after polybutene-1 solidification.

11. A process for permanently adhering a first item of either pure polybutene-1, a polybutene-1 copolymer or blends of the same to a second item of polybutene-1 which comprises the step of:

melting and cooling to solidification said first and second items of polybutene-1;

contacting at room temperature said solidified polybutene-1 first and second items with an amount of cyclohexane sufficient to allow polymer segments within said first and second polybutene-1 items, upon contact of said first and second polybutene-1 items, to entangle, wherein said solidified polybutene-1 first and second items are contacted with said cyclohexane within twenty minutes after polybutene-1 solidification; and contacting at room temperature said first cyclohexane contacted polybutene-1 item with said second cyclohexane contacted polybutene-1 item within twenty minutes to achieve a satisfactory bond.

12. The process of claim 11 wherein cyclohexane is in an adhesive or cement form.

13. A process for permanently adhering a first item of either pure polybutene-1, a polybutene-1 copolymer or blends of the same to a second item of polybutene-1, which comprises the steps of:

melting and cooling to solidification said first and second items of polybutene-1;

contacting at room temperature said solidified polybutene-1, first and second items with an amount of methylene chloride or tetrahydrofuran sufficient to allow polymer segments within said first and second polybutene-1 items, upon contact of said first and second polybutene-1 items to entangle, wherein said solidified polybutene-1 first and second items are contacted with said methylene chloride or said tetrahydrofuran within four minutes after polybutene-1 solidification; and contacting at room temperature said first methylene chloride or tetrahydrofuran-contacted polybutene-1 item with said second methylene chloride or tetrahydrofuran-contacted polybutene-1 item within two minutes to achieve a satisfactory bond.

14. The process of claim 13, wherein said methylene chloride or said tetrahydrofuran is in an adhesive or cement form.

* * * * *